US011333399B2

(12) United States Patent
Roddy

(10) Patent No.: US 11,333,399 B2
(45) Date of Patent: May 17, 2022

(54) APPARATUS FOR MANAGING HOT WATER IN A HOT WATER STORAGE TANK HEATING SYSTEM AND ASSOCIATED METHOD

(71) Applicant: Climote Limited, Dundalk (IE)

(72) Inventor: Ivor Roddy, Dundalk (IE)

(73) Assignee: Climote Limited

( * ) Notice: Subject to any disclaimer, the term of this patent is extended or adjusted under 35 U.S.C. 154(b) by 322 days.

(21) Appl. No.: 15/752,277

(22) PCT Filed: Aug. 16, 2016

(86) PCT No.: PCT/EP2016/069416
§ 371 (c)(1),
(2) Date: Feb. 13, 2018

(87) PCT Pub. No.: WO2017/029285
PCT Pub. Date: Feb. 23, 2017

(65) Prior Publication Data
US 2018/0238587 A1 Aug. 23, 2018

(30) Foreign Application Priority Data
Aug. 14, 2015 (IE) .................................. S2015/0266

(51) Int. Cl.
*F24H 9/20* (2022.01)
*F24H 1/20* (2022.01)
*G05D 23/19* (2006.01)
*F28D 20/00* (2006.01)

(52) U.S. Cl.
CPC ............ *F24H 9/2007* (2013.01); *F24H 1/201* (2013.01); *F24H 1/208* (2013.01); *G05D 23/1927* (2013.01); *F28D 20/0039* (2013.01)

(58) Field of Classification Search
None
See application file for complete search history.

(56) References Cited

U.S. PATENT DOCUMENTS

| 4,135,079 A * | 1/1979 | McGraw | A47L 15/4285 |
| | | | 122/504.2 |
| 4,568,821 A * | 2/1986 | Boe | G05D 23/1905 |
| | | | 219/419 |
| 4,650,158 A * | 3/1987 | Roberts | A47J 31/007 |
| | | | 251/143 |

(Continued)

FOREIGN PATENT DOCUMENTS

| EP | 2051016 A2 | 4/2009 |
| WO | 2012/069497 A1 | 5/2012 |
| WO | 2012/069815 A2 | 5/2012 |

OTHER PUBLICATIONS

R.C. Buckley, Development of an energy storage tank model, Oct. 2012, The University of Tennessee at Chattanooga Chattanooga, Tennessee.*

*Primary Examiner* — Ibrahime A Abraham
*Assistant Examiner* — Gyounghyun Bae

(57) ABSTRACT

An apparatus for managing hot water in a hot water storage tank heating system has one or more temperature sensors, a mounting bracket, a computer implemented processing arrangement configured to receive the temperature sensor signals and an interface to communicate with a user or additional processors either locally or remotely.

24 Claims, 18 Drawing Sheets

(56) References Cited

U.S. PATENT DOCUMENTS

| | | | | |
|---|---|---|---|---|
| 5,020,127 A * | 5/1991 | Eddas | F24H 9/2028 | 219/486 |
| 5,056,712 A * | 10/1991 | Enck | G05D 23/1904 | 236/20 R |
| 5,712,951 A * | 1/1998 | Chou | F24H 1/18 | 122/14.21 |
| 6,293,471 B1 * | 9/2001 | Stettin | F24H 9/2021 | 165/268 |
| 6,535,824 B1 * | 3/2003 | Mansky | B01J 19/0046 | 374/49 |
| 6,647,204 B1 * | 11/2003 | Hutchinson | A47L 11/34 | 15/320 |
| 8,165,726 B2 * | 4/2012 | Nordberg | G05D 23/1917 | 700/300 |
| 8,461,493 B1 * | 6/2013 | Cantolino | F24D 19/1063 | 219/494 |
| 8,909,033 B2 * | 12/2014 | Kreutzman | F24D 19/1048 | 392/308 |
| 9,441,889 B2 * | 9/2016 | Tugurlan | F24H 1/20 | |
| 9,846,085 B2 * | 12/2017 | Newell | G01K 1/14 | |
| 10,295,223 B2 * | 5/2019 | Launay | F24H 9/2021 | |
| 2004/0079749 A1 * | 4/2004 | Young | F24H 1/202 | 219/486 |
| 2007/0175883 A1 * | 8/2007 | Miu | F24H 9/2021 | 219/400 |
| 2008/0032347 A1 * | 2/2008 | Sarofim | B01L 7/52 | 435/91.2 |
| 2010/0004790 A1 | 1/2010 | Harbin, III et al. | | |
| 2010/0116812 A1 * | 5/2010 | Watson | F24H 1/202 | 219/481 |
| 2010/0186496 A1 * | 7/2010 | Galley | G01P 13/006 | 73/170.06 |
| 2011/0139144 A1 * | 6/2011 | Zheng | F24S 40/60 | 126/588 |
| 2012/0118060 A1 * | 5/2012 | Kimura | G01L 11/002 | 73/384 |
| 2013/0051777 A1 * | 2/2013 | Brian | F24H 9/2007 | 392/464 |
| 2013/0197827 A1 | 8/2013 | Besore | | |
| 2013/0209315 A1 * | 8/2013 | Kimura | G01N 25/4826 | 422/88 |
| 2013/0289784 A1 * | 10/2013 | Cooper | G05B 15/02 | 700/286 |
| 2014/0036953 A1 * | 2/2014 | Kimura | G01J 5/02 | 374/121 |
| 2014/0217187 A1 * | 8/2014 | Wen | F24H 9/2007 | 236/25 R |
| 2014/0321839 A1 * | 10/2014 | Armstrong | H02J 13/00002 | 392/463 |
| 2014/0334107 A1 * | 11/2014 | Heresztyn | G01K 7/01 | 361/720 |
| 2014/0343888 A1 * | 11/2014 | Bourke | F24D 19/1063 | 702/136 |
| 2015/0148971 A1 * | 5/2015 | Acker | G05B 15/02 | 700/282 |
| 2015/0253051 A1 * | 9/2015 | Jin | F25B 49/02 | 62/56 |
| 2016/0084553 A1 * | 3/2016 | Seki | F25B 49/02 | 62/204 |
| 2016/0138813 A1 * | 5/2016 | Rimpler | F24D 17/0068 | 392/454 |
| 2016/0138830 A1 * | 5/2016 | Lesage | G05D 23/1934 | 219/486 |
| 2017/0020034 A1 * | 1/2017 | Kondo | H05K 7/20945 | |
| 2018/0180303 A1 * | 6/2018 | Kellicker | F24D 19/1051 | |

* cited by examiner

APPARATUS FOR MANAGING HOT WATER IN A HOT WATER STORAGE TANK HEATING SYSTEM AND ASSOCIATED METHOD

The present invention relates to apparatus and method for managing hot water in a hot water storage tank heating system.

The invention enables the management of hot water in a hot water storage tank by tracking the temperature profile of the water within the tank (often referred to as stratification). A conventional way to do this is to put temperature sensors along the length of the tank. However with modern tanks, insulation is often built on to the tank making it very difficult to do this effectively and also has practical complications due to location of tank etc.

The apparatus of the present invention being claimed can provide this functionality by only monitoring the temperature at the outlet pipe and using software to calculate the temperature profile in the tank based on known and discovered properties of the tank.

The invention is more particularly defined in the appended claims which are incorporated in this description by reference.

The invention will hereinafter be more particularly described with reference to the accompanying drawings which show, by way of example only, a number of embodiments of an apparatus and method for managing hot water in a hot water storage tank heating system in accordance with the invention.

The apparatus comprises either one or more temperature sensors, either one or more mounting brackets, a computer implemented processing arrangement locally or remotely configured to receive the temperature sensor signals and an interface to interface with a user or additional processors either locally or remotely.

Figure 1:
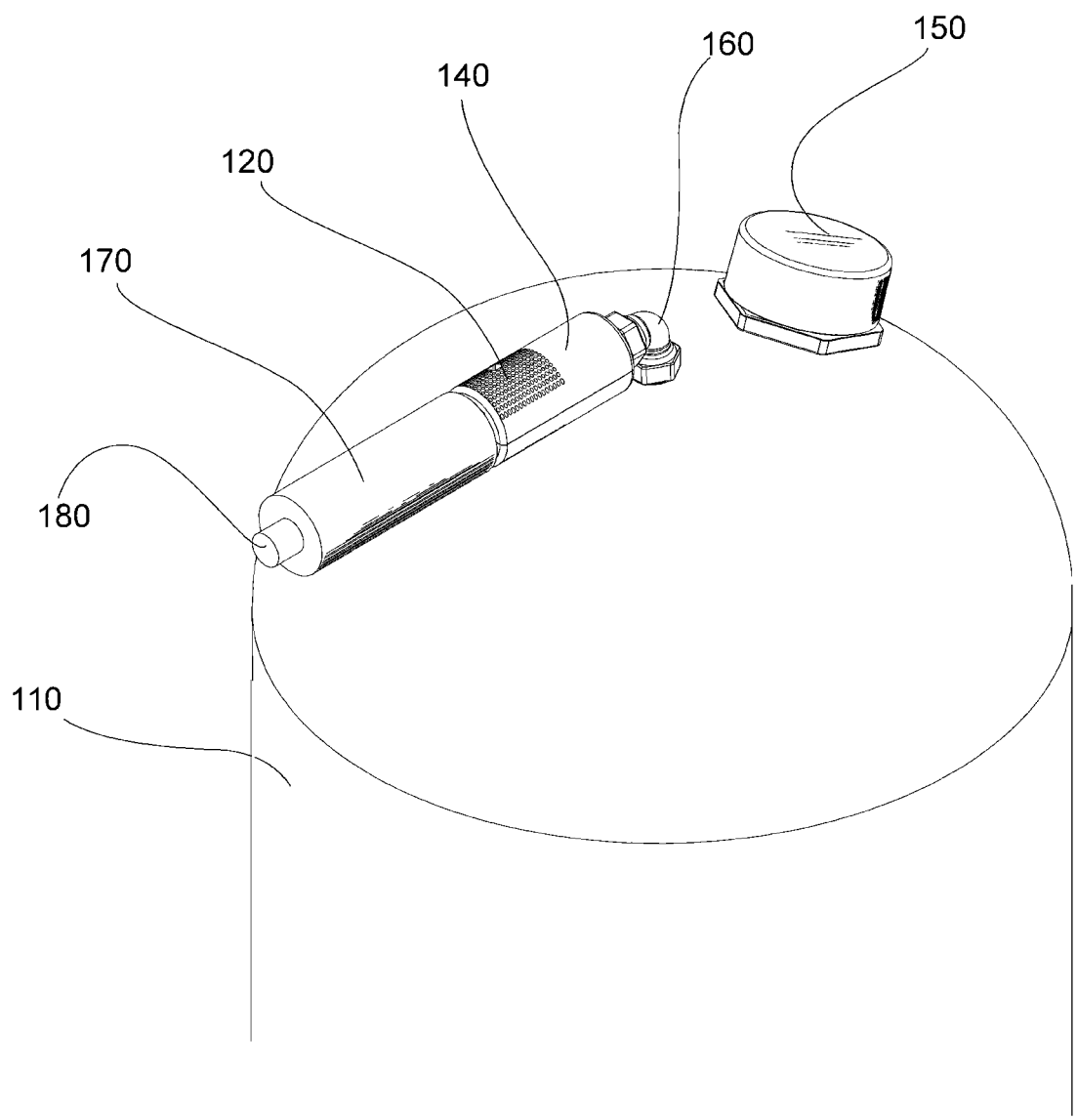
FIG. 1 outlines the key components of a hot water tank including the outlet pipe, the pipe insulation and one embodiment of a temperature sensor enclosure.

FIG. 1 shows one embodiment of the apparatus where the mounting bracket is attached to the outlet pipe of the hot water tank. The bracket is arranged to hold one or more temperature sensors. The sensors are arranged to provide a processing means with temperature sensor signals from the hot tank outlet. The processing means is arranged to run a number of processing methods to establish the temperature distribution within the tank.

Having sensors fitted only on the outlet pipe gives considerable advantages over an arrangement comprising sensors along the length of the tank, particularly with modern tanks, that have insulation incorporated onto the skin of the tank making it very difficult and essentially unfeasible to directly mount sensors to accurately measure the temperature at different heights in the tank.

The method incorporated in the processing element models the tank as discrete uniform elements along its vertical axis. The properties of the water in the aforementioned elements is presumed to be uniform across the element. Empirical stratification models have been developed for different tank geometries and energy sources. Energy input levels can be directly measured using a current transformer with the processing element configured to receive signal from current transformer.

Alternatively power levels of each heating element can be input as fundamental properties of the system for incorporation into the method.

The dynamic characteristics of the temperature recorded by the temperature sensor closest to the top of tank sensor 315, together with information on energy source (either sensed or input as a characteristic), can be used to determine energy stratification from energy source to discrete elements within the tank allowing a profile model within the tank to be recursively developed over time.

After an indirect energy source has been used, a full or partial discharge cycle of the system will allow energy input from said source to be determined for future use in the stratification model. Energy losses from the tank will be dependent on various characteristics of the system and environment such as temperature delta between ambient and elements, thickness and properties of insulation etc. The processing element uses a lower bandwidth dynamic property of the temperature at location T1 to establish the energy storage properties of the tank and updates the energy storage of each sub element accordingly.

In addition the loss rate from the tank is dependent on the energy storage density in the tank i.e. a smaller volume of water will cool faster than a larger volume of water stored at the same temperature This characteristic can be used by the system to determine key performance characteristics of the system.

The largest source of energy loss from the system will be when hot water is drawn from the system. The outlet pipe will have a slight temperature difference to the top temperature of the tank, due to the cooling effect of ambient air on the outlet pipe. When water is drawn from the system, the outlet pipe will momentarily experience a temperature rise which the processing element uses to detect water being drawn from the system.

Accuracy can be improved by incorporating a second sensor further along the outlet pipe, which can be further enhanced by providing additional cooling features 311 around the second sensor 312 (T2), which will promote a larger temperature delta across the outlet monitoring bracket thereby increasing accuracy.

The processing element will use the temperature delta to identify when water is being drawn from the system. Once water stops flowing the outlet pipe will again cool allowing the processing element to detect when water flow has ceased. Again accuracy is improved by incorporating the second temperature sensor such that temperature deltas are increased.

The rate at which the temperatures converge can be used to help ascertain the flow rate through the pipe.

As water is drawn from the system, which will be from the highest sub element of the system, cold water is drawn into the system, at the lowest sub element. Internal energy transfer within the system will be in a vertical direction from sub element to sub element which the processing element incorporates into the aforementioned stratification model such that the resultant model will have incorporated the energy drawn from the system and the impact that it will have had on the energy stratification within the system.

$$\text{Element}(x)\_t(0) = \text{element}(x)\_t(-1) * \text{Loss\_rate} + [\text{element}(x+1)\_t(-1) - \text{element}(x)\_t(-1)] * \text{flow}$$

Where

Element(x)_t(0) is the current energy storage above 0° C. for any sub element of the tank Element(x)_t(−1) is the energy storage above ambient for the current sub element calculated in the previous predefined period Element(x+1)_t(−1) is the energy storage in the sub element below element x in the previous predefined period flow=flow rate from system Loss_rate=inefficiency rating of tank The iterative method incorporated in the processing element will therefore maintain a real time representation of energy storage of each sub element of the hot tank system. Applying the specific heat capacity property of water to the method allows the profile to be converted to temperature of each sub section. Once the desired water temperature is known, the available hot water can be determined by calculating volume of ambient water to be added to each sub element in order to deliver water at the required temperature thereby calculating the total potential capacity of useful hot water.

$$L = \sum_{sec=1}^{n} \text{if } (T(sec) > Tu, Ls * (T(sec) - Tu)/(Tu - Ta))$$

Where

L=total useful litres available

Sec=section number

T(sec)=temperature of sub section

Tu=predefined temperature of required water

Ls=capacity of each sub section

Ta=temperature of cold water feed

This allows the system to report to the user in real time the available capacity of hot water.

The empirical stratification models are used to recursively predict future stratification profiles within the tank when different energy sources are enabled. The processing element incorporates an input mechanism from the user to request a fixed amount of hot water. The processing element recursively predicts the stratification in the tank based on each heating source to deliver the said volume of water and makes a decision on which heating source to engage and what rate to deliver said volume of water based on either minimising energy usage, speed of delivery or cost of delivery, depending on which is considered a higher priority.

The processing element will control the energy source as required, and monitor system performance to provide closed feedback control and notify the user when the required volume of water is available. This functionality provides considerable advantages to the end user as the user can interact with the system by requesting volumes of water and the system intelligently manages the system to deliver the required amount of water as quickly as possible or with minimum amount of waste.

The processing element will also incorporate a remote communications element which will allow the system to receive requests or commands remotely. This allows the system to act as an element in a macro system where multiple systems can be controlled together for grid management purposes. An example of this application is in the event of large amounts of excess renewable energy being available, multiple systems can be commanded on (based on their reported available capacity) to use the excess energy and stabilise the grid.

The processing element will collect data on the heat loss properties of the tank. This information can be used to give the tank and system an energy efficiency rating and identify which systems are under performing and suitable for upgrade to more modern, energy efficient alternatives.

The processing element will be identifying hot water draw from the system and will incorporate a learning element to predict repeat cycles of usage. The system can then proactively manage the system to deliver these patterns of usage, as well as incorporating an efficient contingency amount of water to be permanently available for the user.

The system will collect considerable data on hot water usage which can also be collated for social studies on hot water usage, energy usage, behaviours etc.

Detailed Description of the Drawings and Operation of the Invention

In FIG. 1 a hot water tank 110 is shown with a hot water outlet pipe 180 attached to the said tank by a coupling elbow 160. The pipe has a section of insulation 170 and one embodiment of the temperature sensor enclosure 140 fitted next to the said elbow 160. There is also an Immersion heating element 150 on top.

Figure 2:
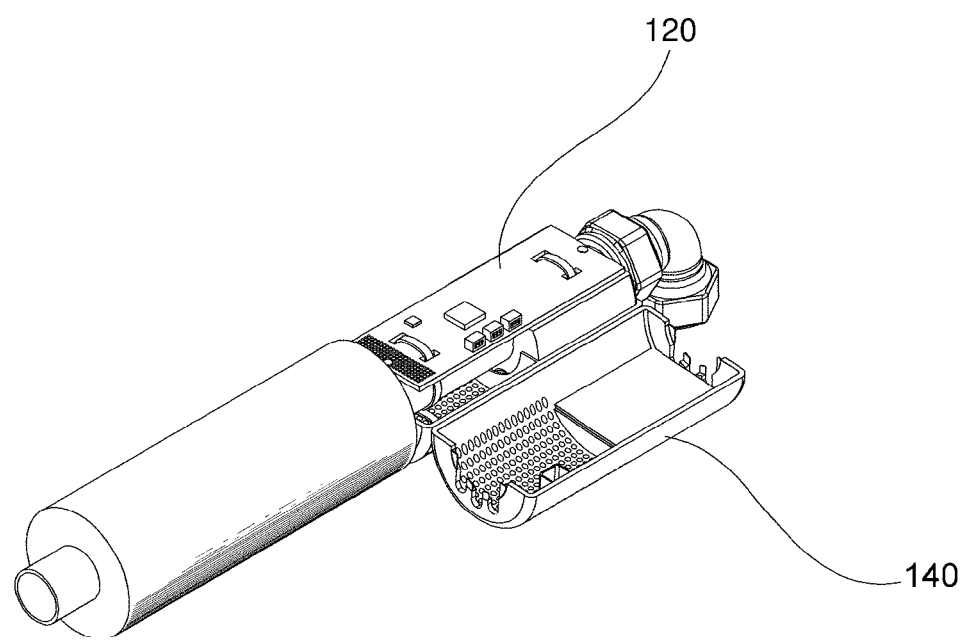
FIG. 2 illustrates the hot water outlet pipe with one embodiment of the temperature sensor mounting bracket in its open position.

FIG. 2 shows the same sensor enclosure 140 in the open position, allowing one embodiment of the temperature sensor mounting platform 120 to be seen.

Figure 3:
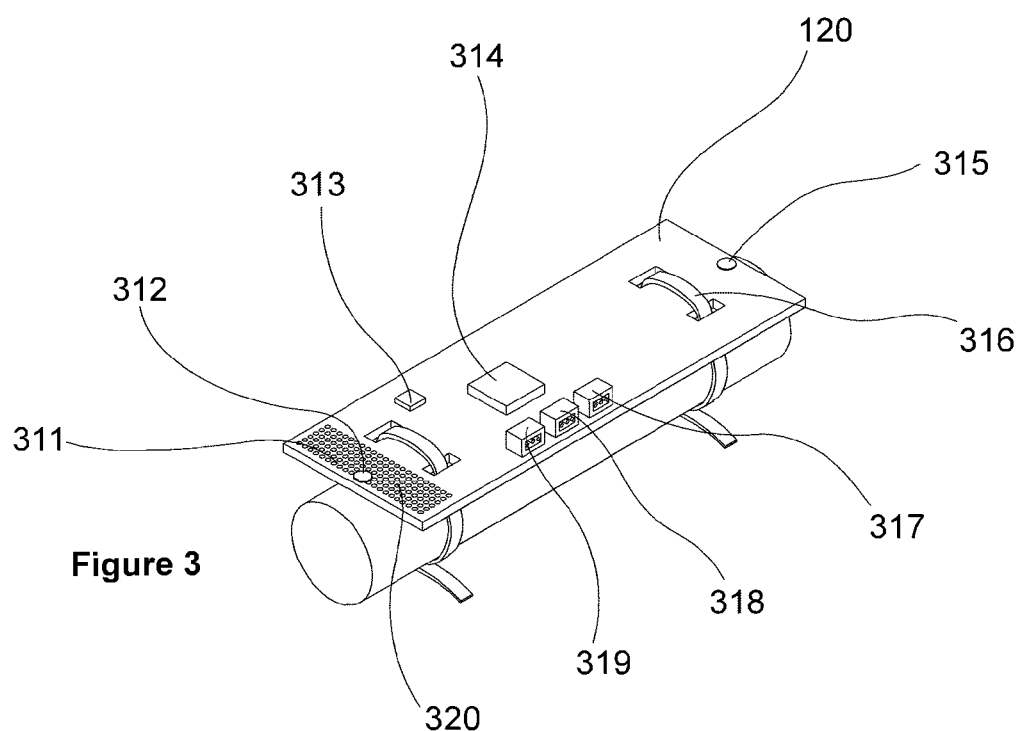
FIG. 3 illustrates one embodiment of the sensor mounting platform.

FIG. 3 illustrates a temperature sensor mounting platform 120 including the first temperature sensor 315, the second temperature sensor 312, the outlet pipe heat sink 311 and the ambient temperature sensor 313 for additional accuracy are also shown. The ambient temperature sensor is arranged to provide the processing arrangement with data on the ambient temperature that is acting upon the inlet pipe. This allows the system to dynamically compensate for the effect this has on the outlet sensors rate of change and the offsets required in normal operation. Processing means 314, auxiliary terminal (1) 317, auxiliary terminal (2) 318, and auxiliary terminal (3) 319 are also illustrated together with the TEC heat sink 320 and the mounting clamp 316.

Figure 4:
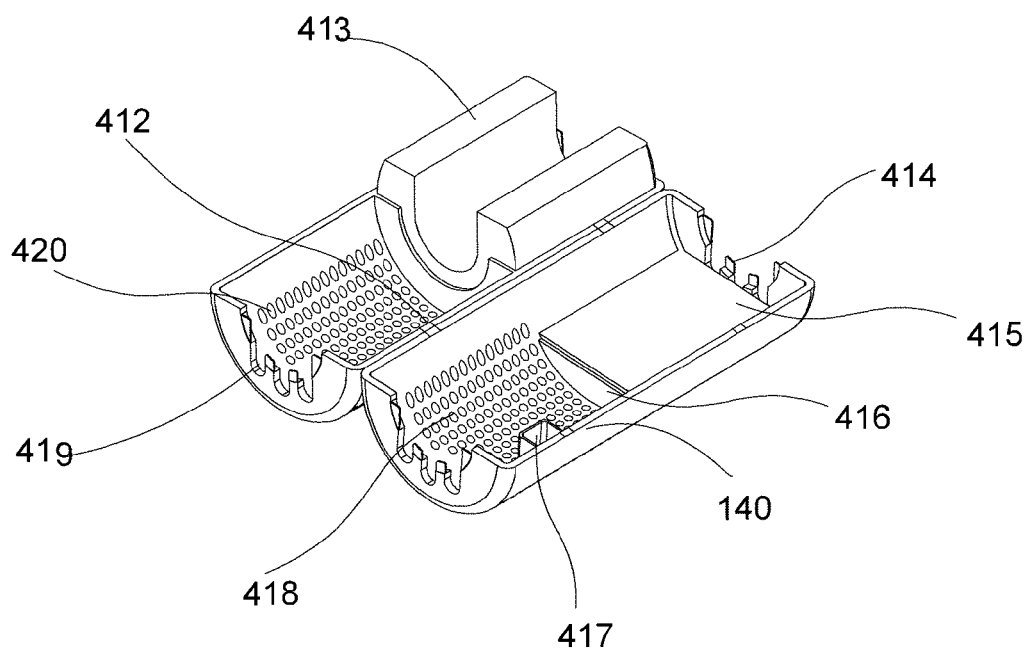
FIG. 4 details the enclosure in the open position.

FIG. 4 shows the features of enclosure 140 starting with the hinge mechanism 412 first temperature sensor insulation bottom 413, the first temperature sensor insulation top 415, second sensor ventilation perforations top and bottom 418/420, the variable diameter adjustment tabs 414, the ambient temperature sensor duct 417 and cable entry cut-outs 419.

Figure 5:
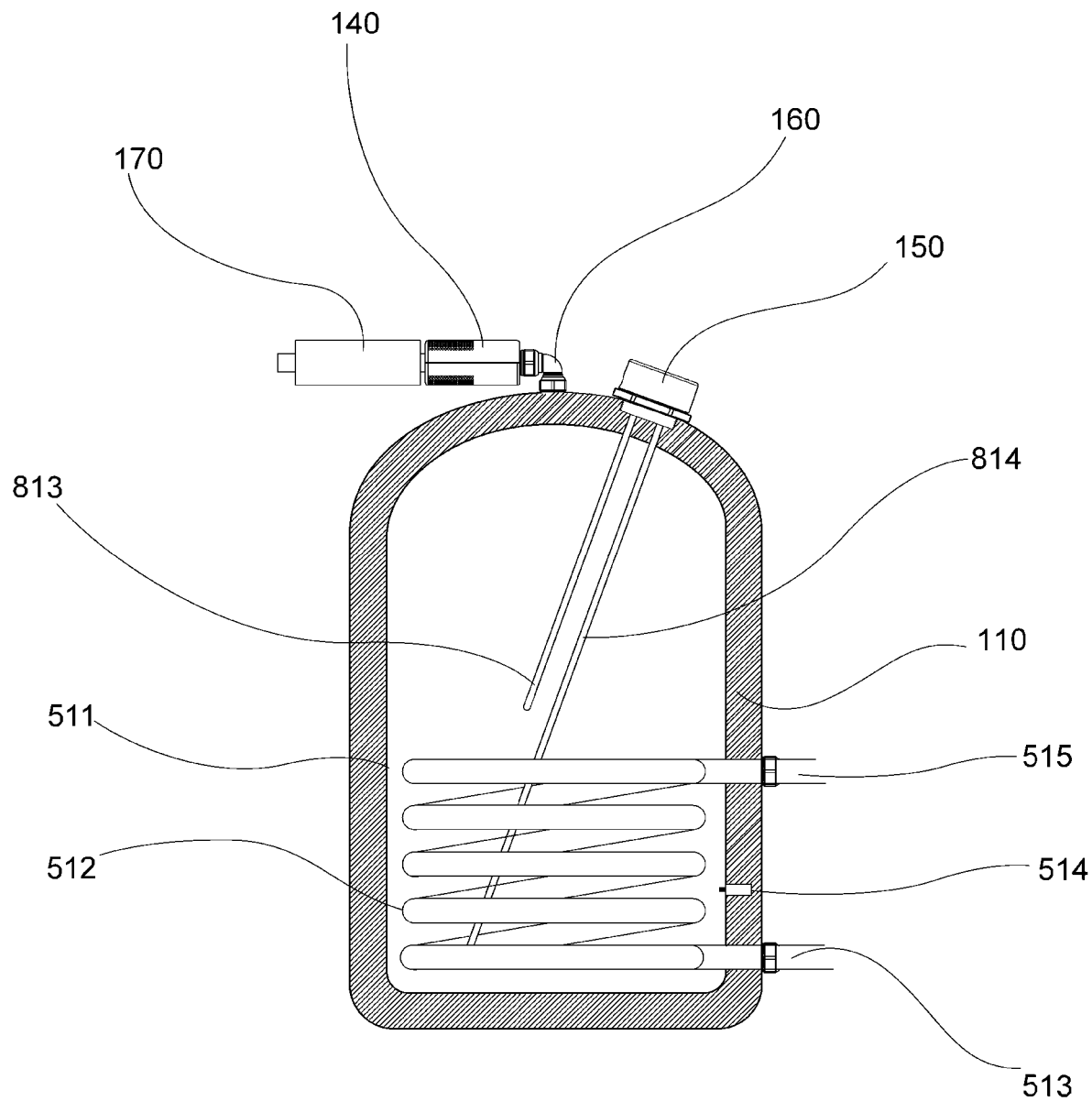
FIG. 5 shows a sectional view of a typical hot water storage tank with a hot water outlet pipe with one embodiment of the temperature sensor mounting bracket attached.

FIG. 5 shows a sectional view of a typical hot tank 110 with a heating exchange coil 512, inlet 515, outlet 513, tank insulation 511 and hot water thermostat pickup point 514. If the thermostat pickup point 514 is available, it can be applied to auxiliary terminal 318 when control over heating exchange coil 512 is required.

Figure 6:
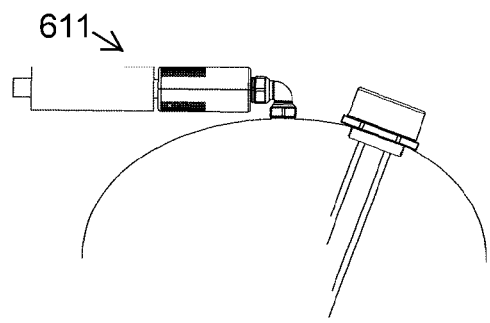
FIG. 6 shows a number of different mounting options for different fitting layouts.
Figure 6:
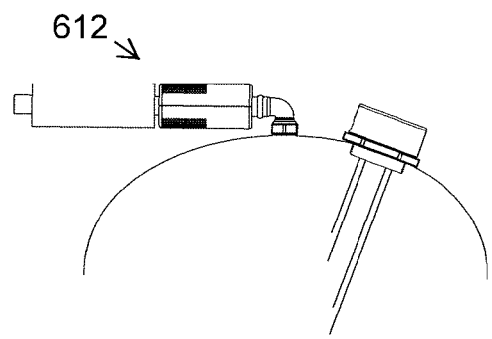
Figure 6:
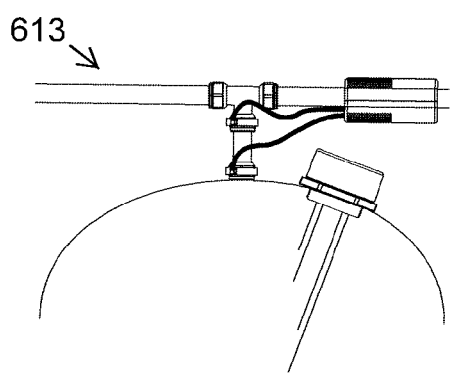
Figure 6:
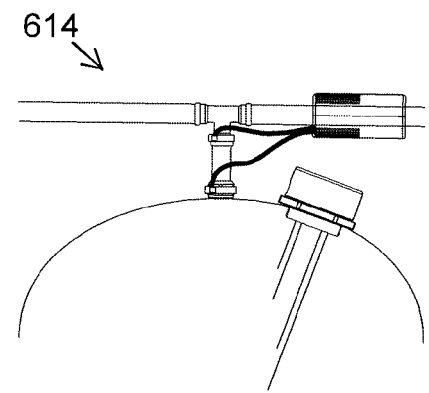
Figure 6:
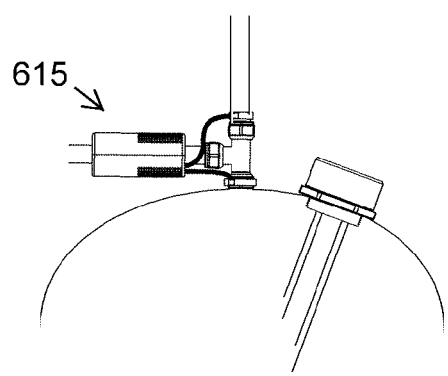
Figure 6:
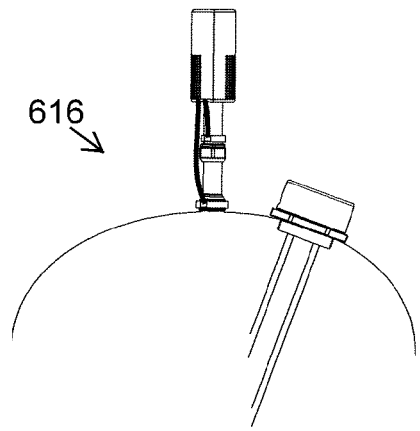
Figure 6:
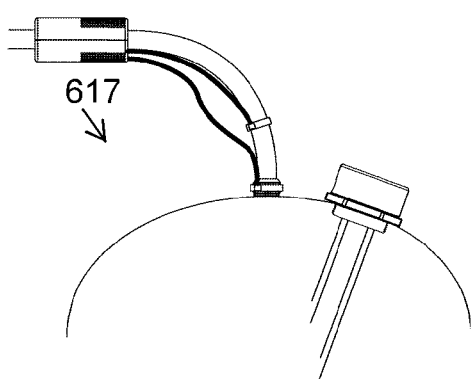
Figure 6:
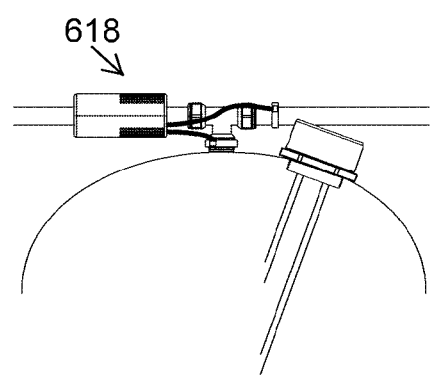

FIG. 6 shows a number of different mounting options for different fitting layouts 611-618 including the use of auxiliary temperature sensors where they are required.

Figure 7:
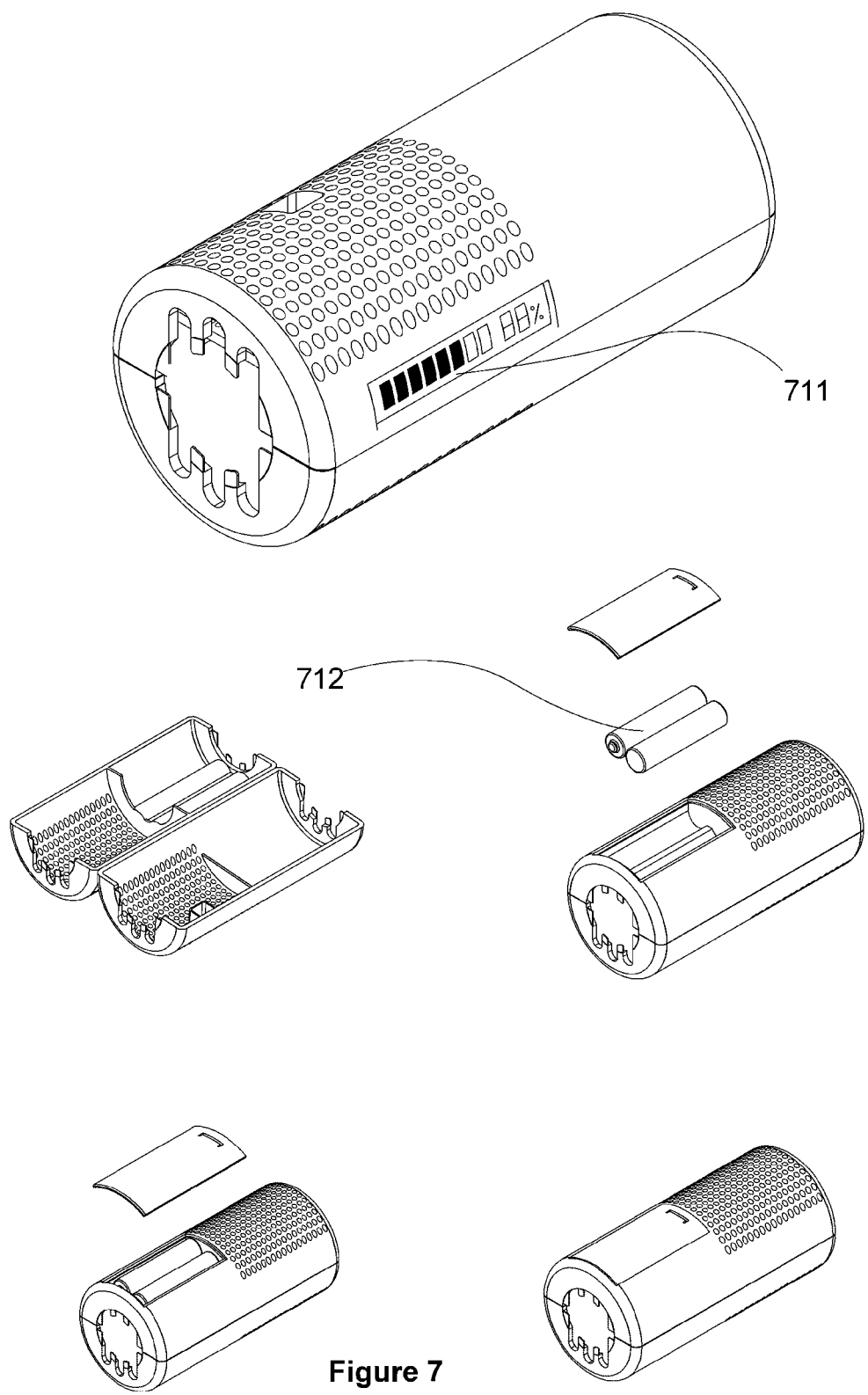
FIG. 7 shows two embodiments of the invention one showing an embodiment with a display interface panel and another embodiment showing a battery powered version.

FIG. 7 shows two embodiments of the invention one showing an embodiment with a display interface panel 711 and another embodiment showing a battery powered version 712 which can communicate using RF radio.

Figure 8:
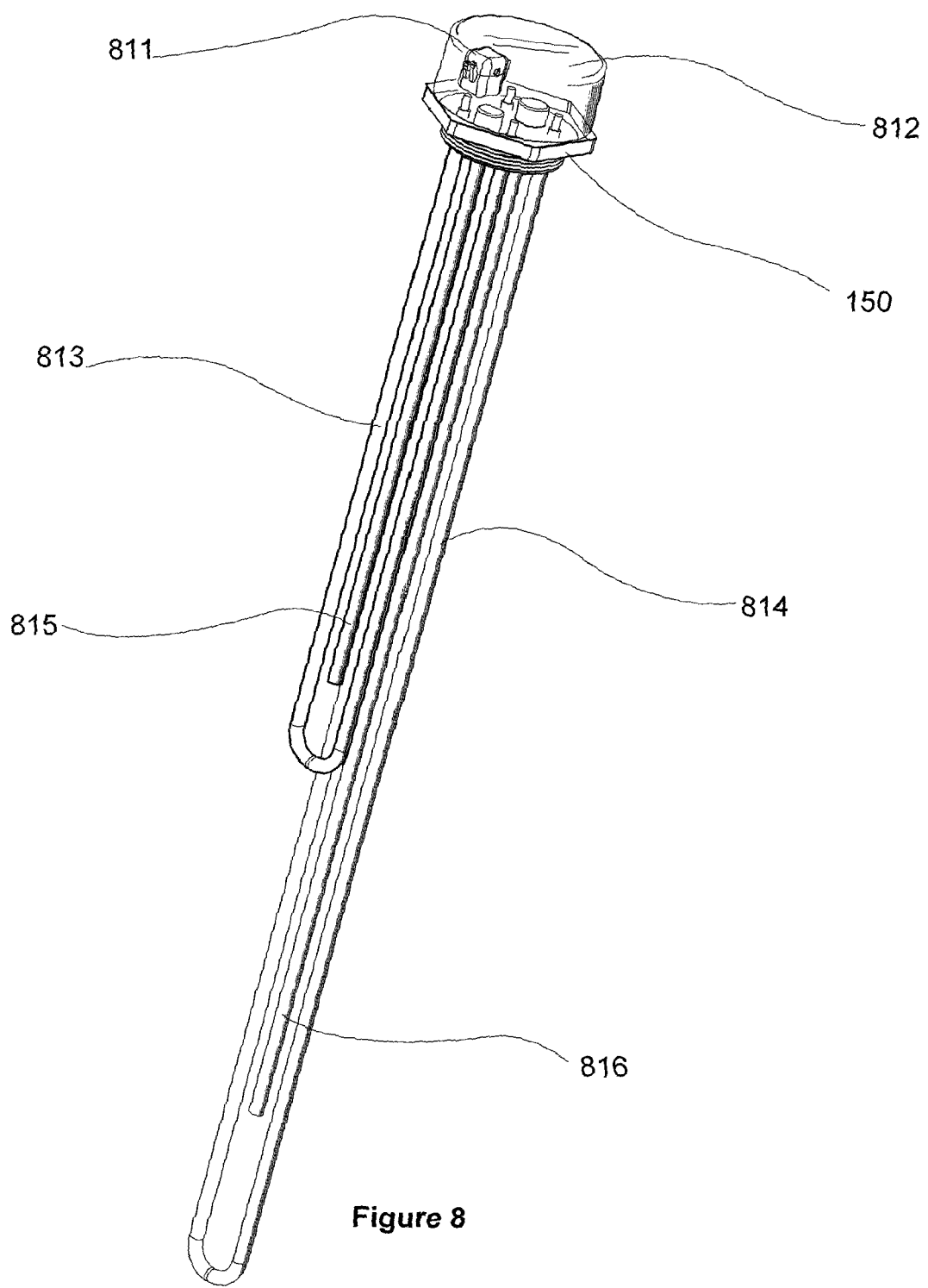
FIG. 8 shows an example of a typical immersion element.

FIG. 8 shows an example of a typical immersion element including sink element 813 sink thermostat 815 and bath element 814 bath thermostat 816. It also shows a current clamp 811 and immersion cover 812.

Figure 9:
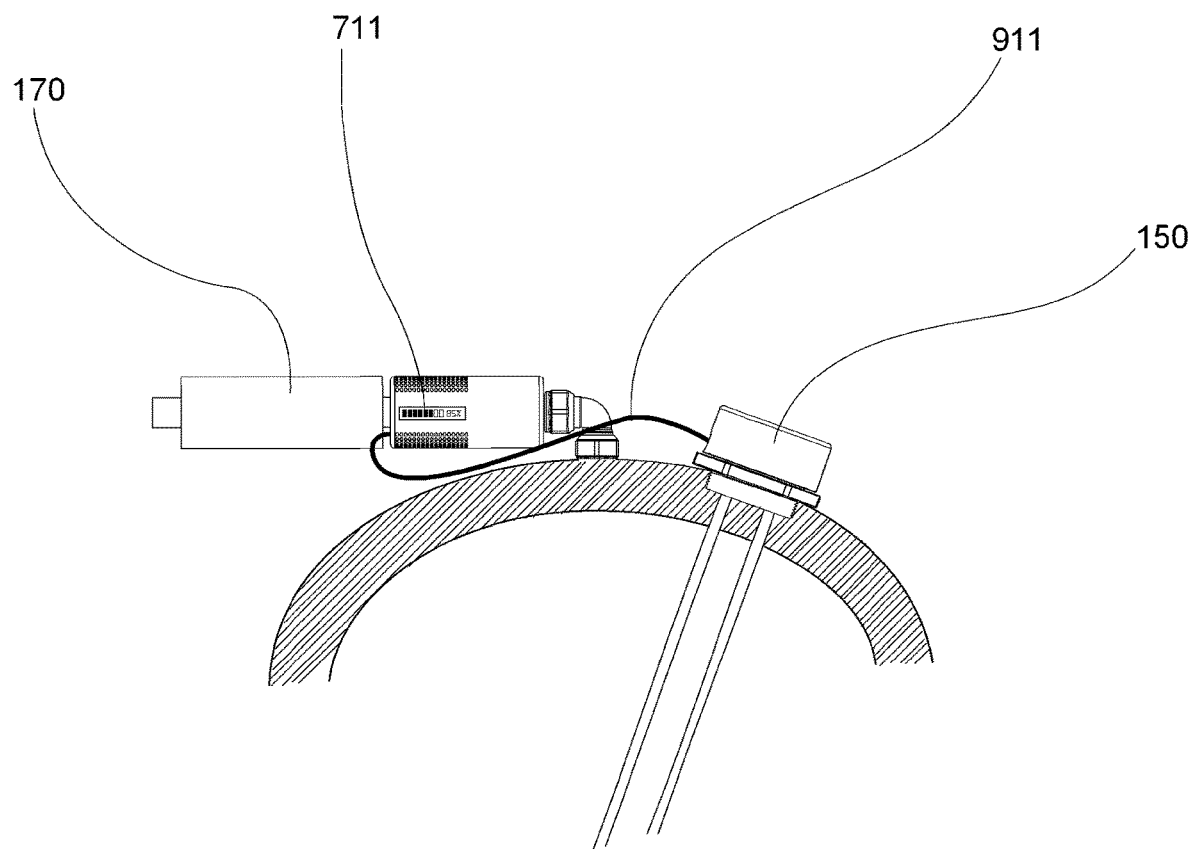
FIG. 9 shows one embodiment of the invention where a current clamp is attached inside the immersion enclosure.

FIG. 9 shows the connection 911 between a current clamp inside the immersion and an embodiment of the invention that includes a display interface panel 711.

Figure 10:
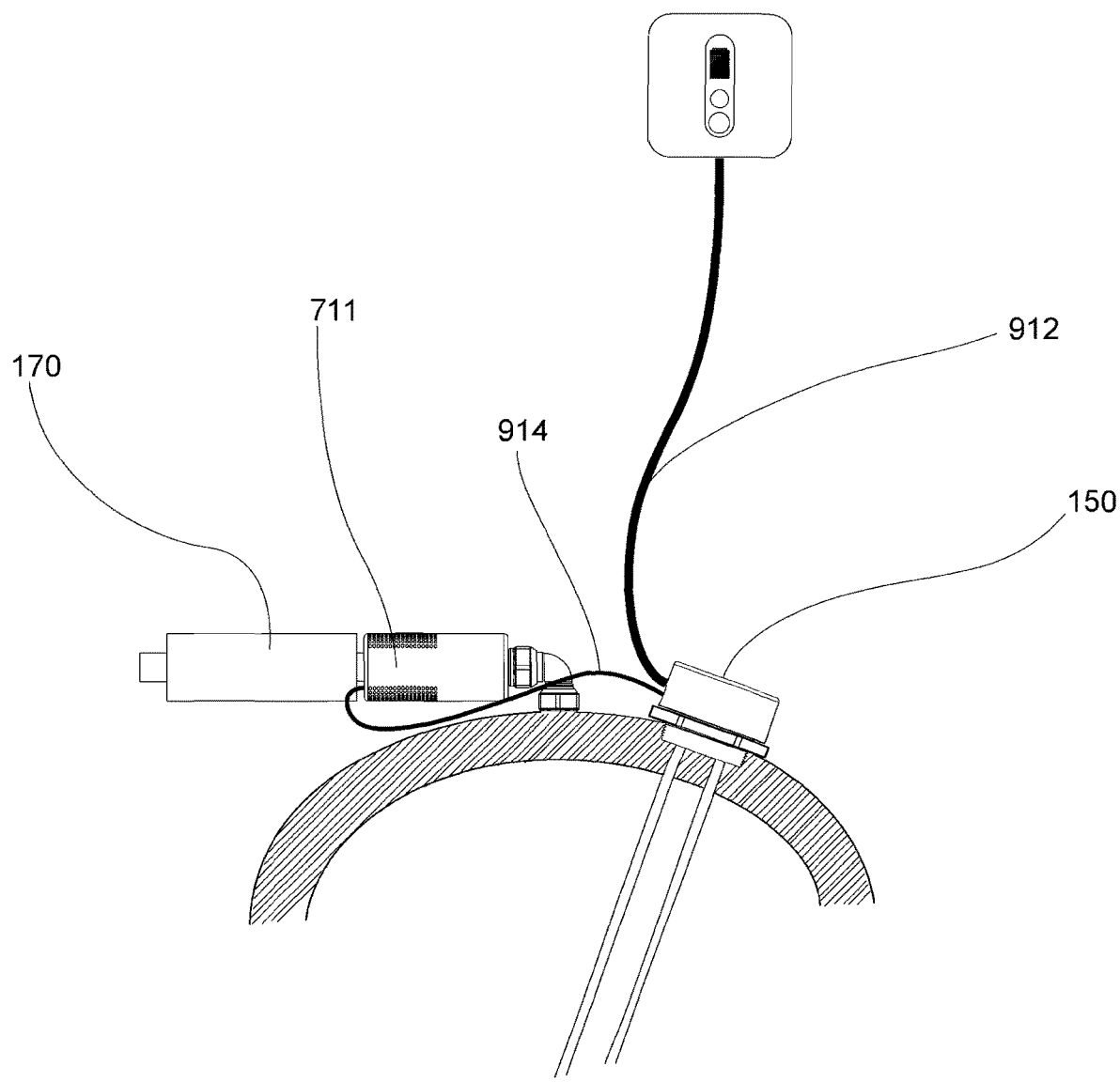
FIG. 10 illustrates one embodiment of the invention which depicts the communication between the invention and a control apparatus using power line communications.

FIG. 10 illustrates one embodiment of the invention which depicts the communication cable 914 between the invention and a control apparatus cable 912 using power line communication technology.

Figure 11:
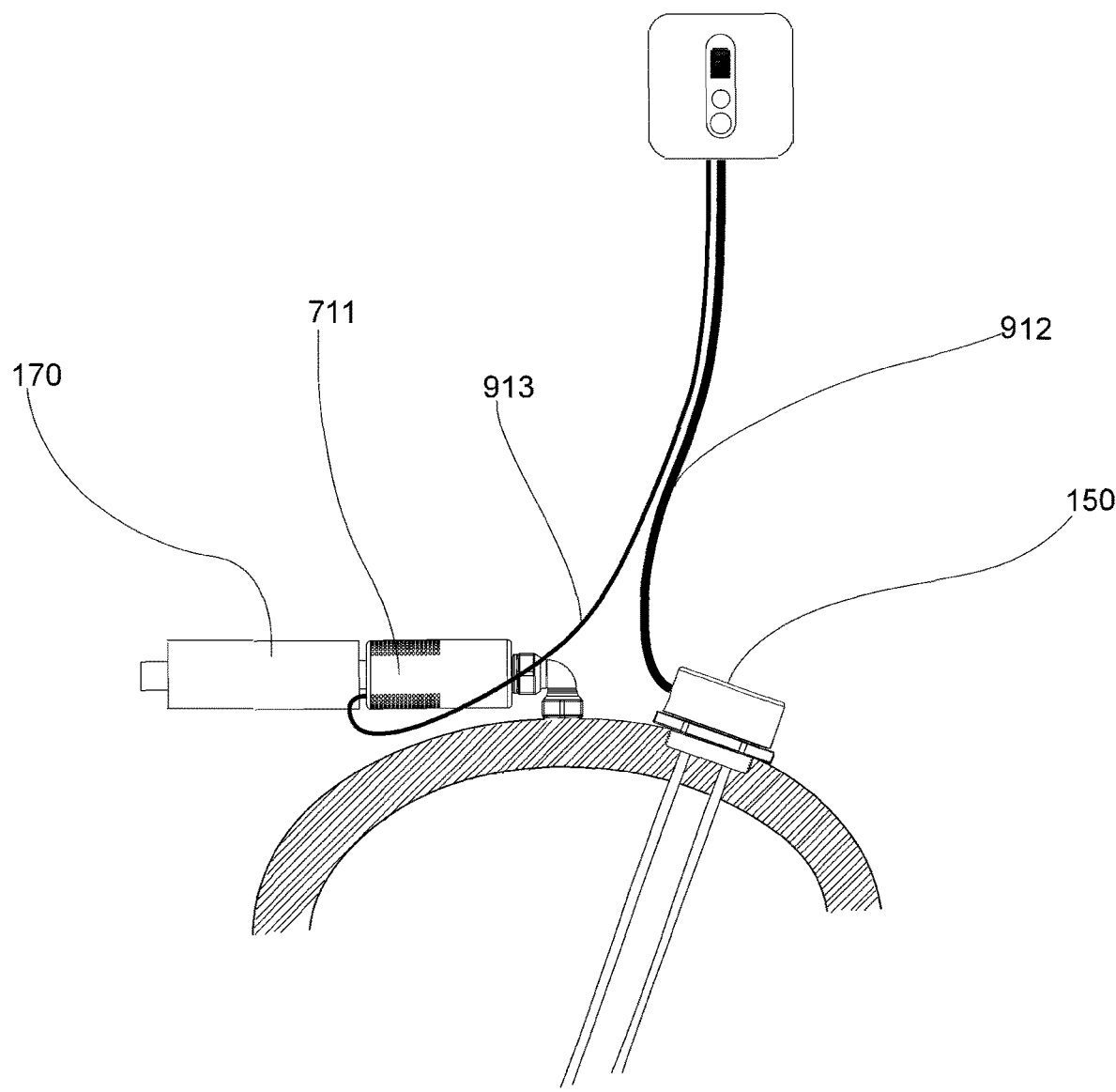
FIG. 11 illustrates one embodiment of the invention which shows a communication cable feeding directly to a remote controlled apparatus.

FIG. 11 illustrates one embodiment of the invention which shows a communication cable 913 feeding directly to a remote controlled apparatus.

Figure 12:
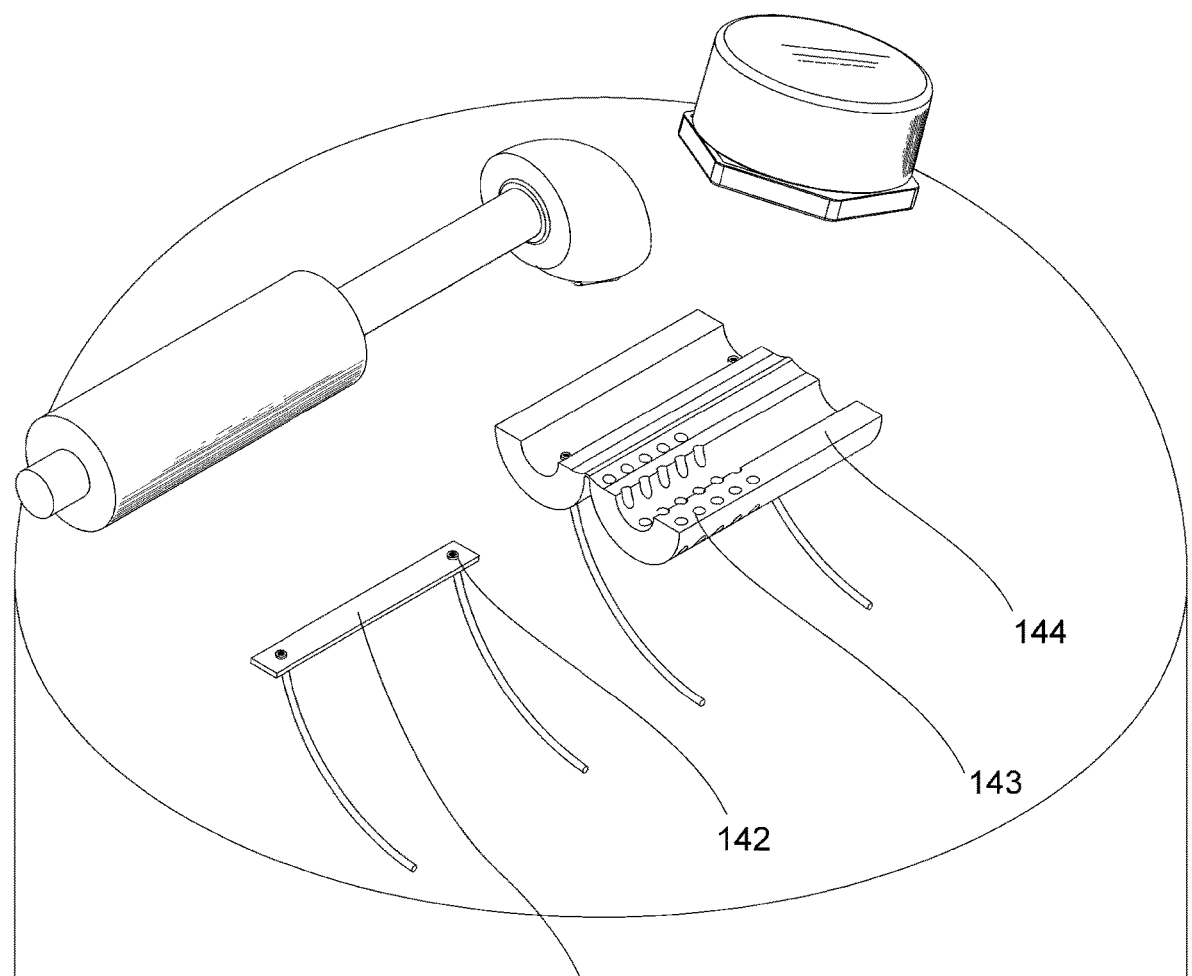
FIG. 12 illustrates two additional embodiments of a temperature sensor mounting apparatus including one sensor platform that mounts directly in to the pipe lagging.

FIG. 12 illustrates two additional embodiments of a temperature sensor mounting apparatus 144, including one sensor platform 141 that mounts directly in to the pipe lagging.

Figure 13:
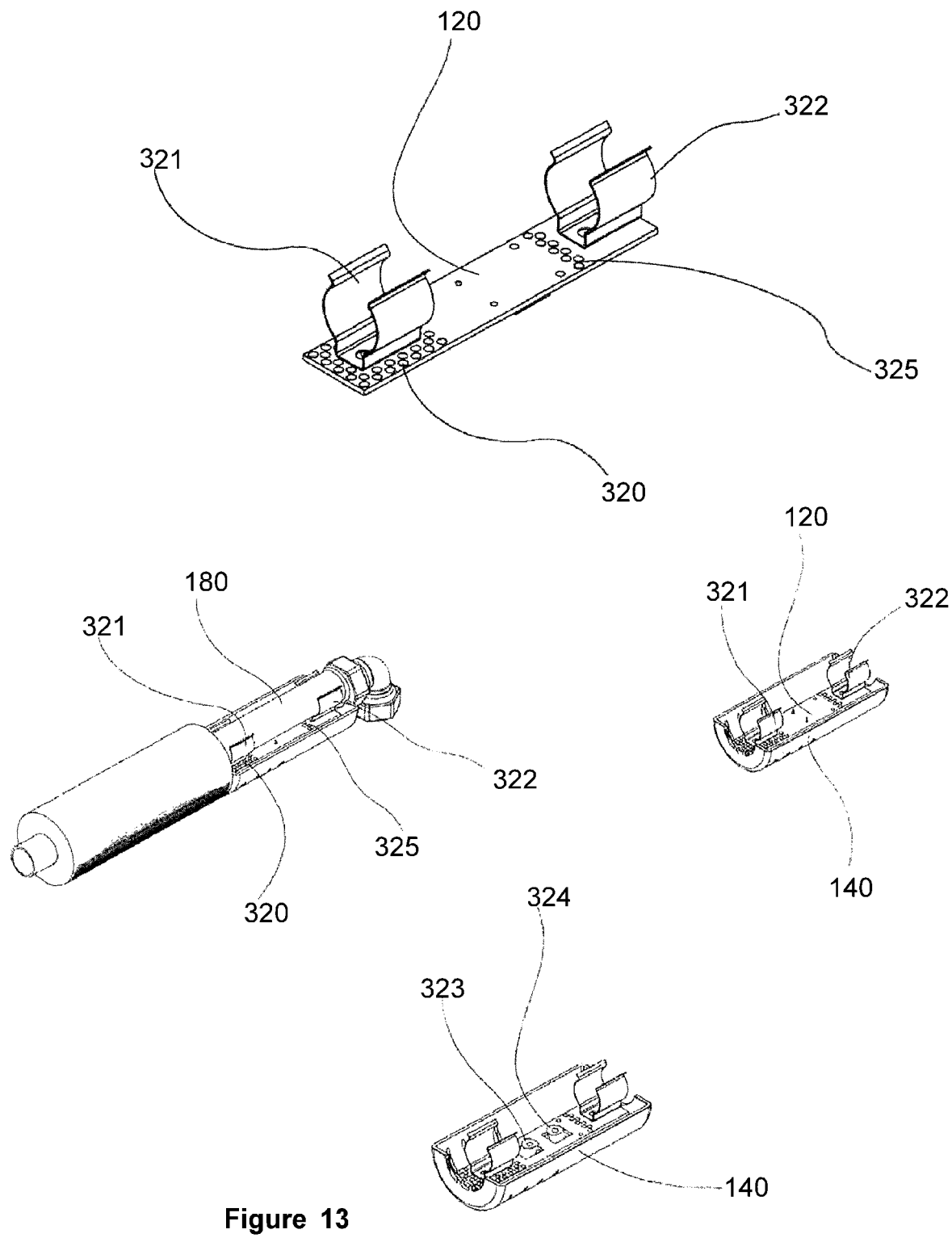
FIG. 13 outlines some alternative components of a temperature sensor enclosure including spring clip mechanism that engages with an outlet pipe, mounting platforms, ultra sonic detectors and heat sinks.

FIG. 13 illustrates a temperature sensor mounting platform 120 including first pipe attachment clip 321 and second pipe attachment clip 322, where each clip is arranged to act directly upon a temperature sensing element, heat sink 320 and thermal barrier 325. The hot water outlet pipe 180 attached to said clips is also shown. One embodiment of a sonic flow meter is shown via probes 323 and 324.

Figure 14:
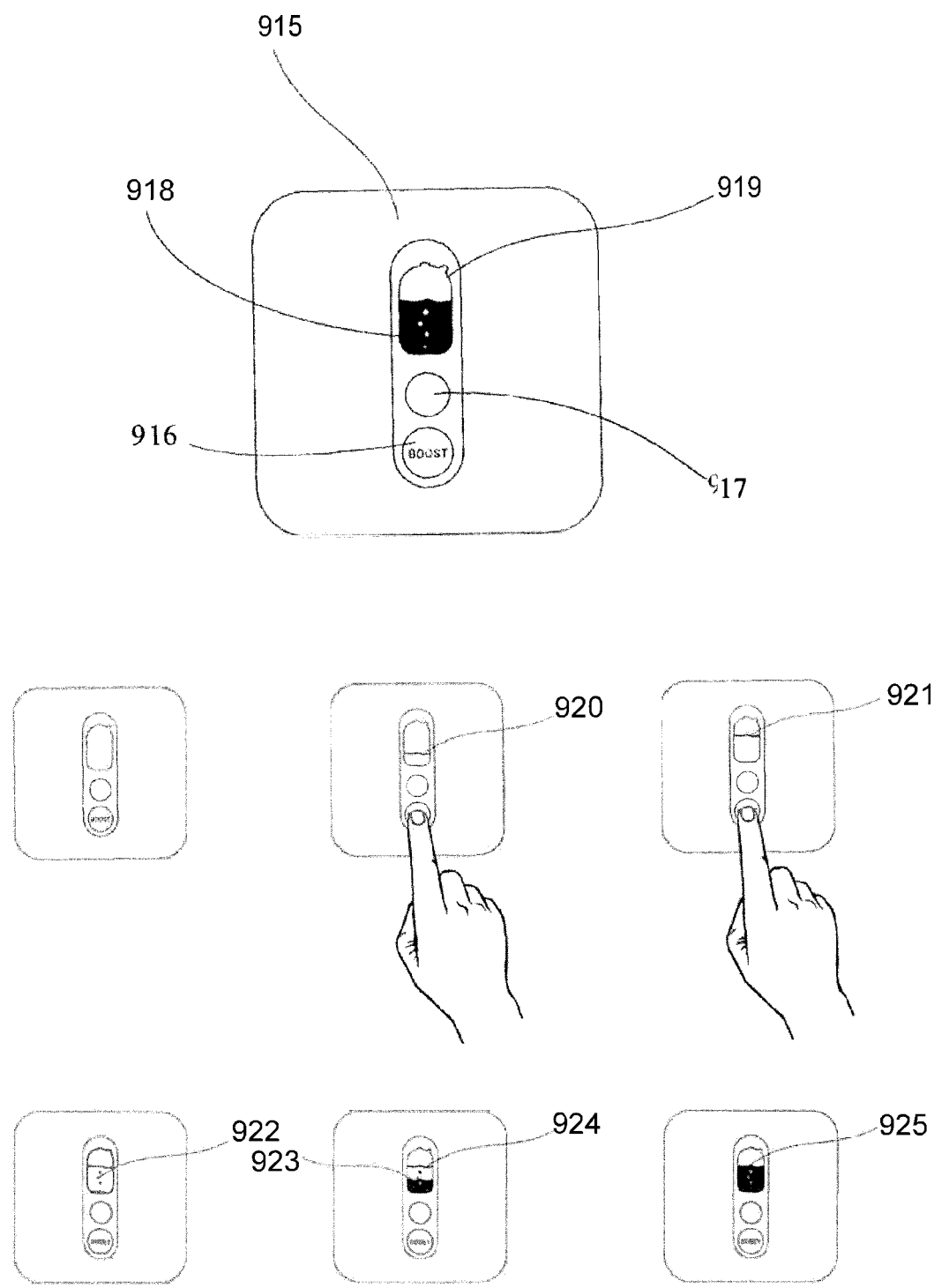
FIG. 14 outlines some key optional features of a wall mounted user interface.

In FIG. 14, a wall mounted hub 915 is shown including visual representation of a hot water tank 919 including hot water level 918, a boost button 916 for boosting and interacting with said hub and an electric isolator button 917. Useful hot water target level is shown in two states 30% 920 and 60% 921. One embodiment indicating water being heated is shown in the form of bubbles rising 922, a rolling wave 924 indicating target volume of useful water above actual volume of useful hot water level is also shown 925.

Figure 15:
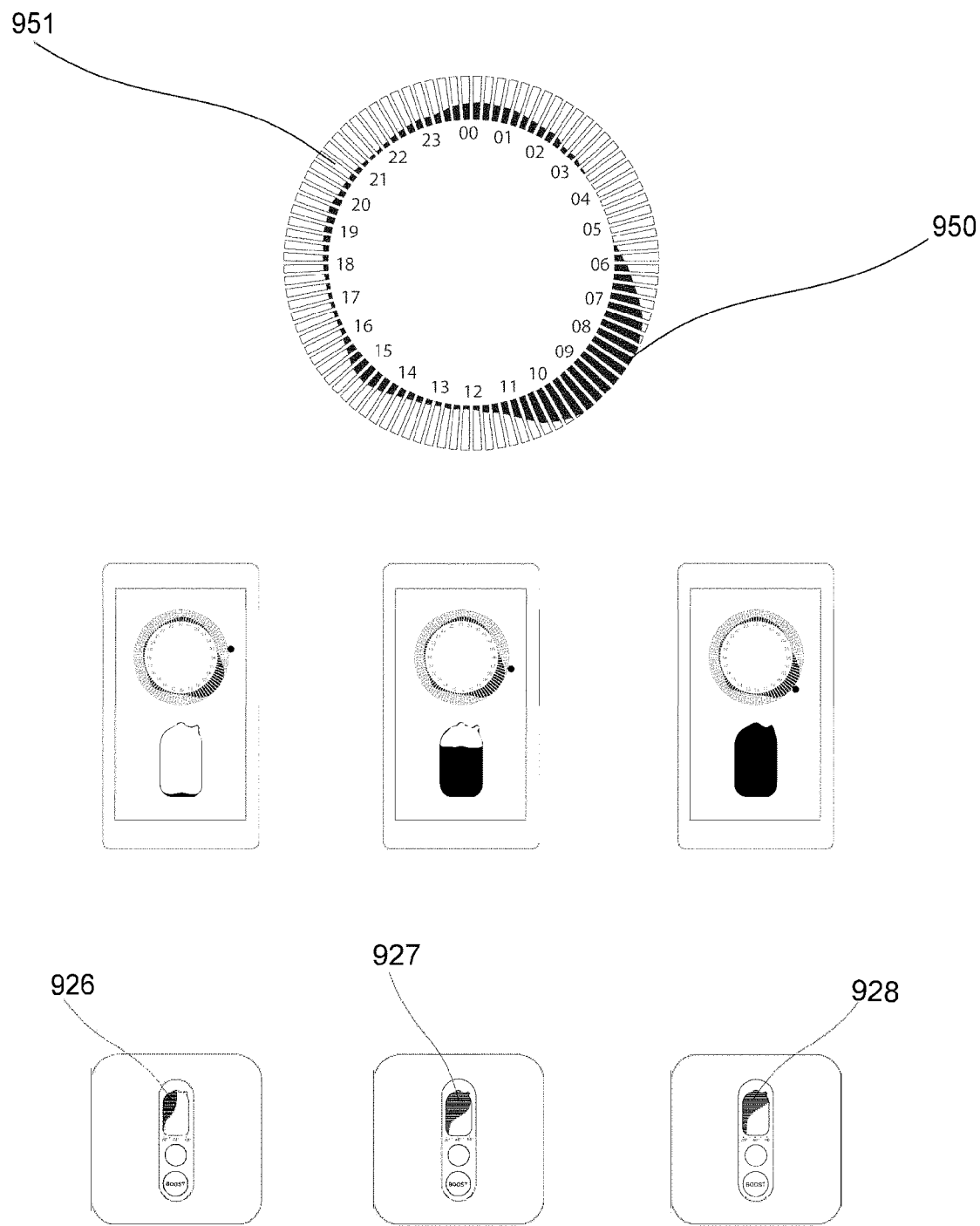
FIG. 15 illustrates one embodiment of a user interface for viewing and scheduling hot water.

In FIG. 15 a dial is used to display the level of water available at any given time during a 24 hour period. An almost empty tank is indicated at 951 and a full tank is indicated at 950 using segments in said dial. One embodiment showing hot water level/temperature within the tank in varying states 926, 927 and 928 is included.

Figure 16:
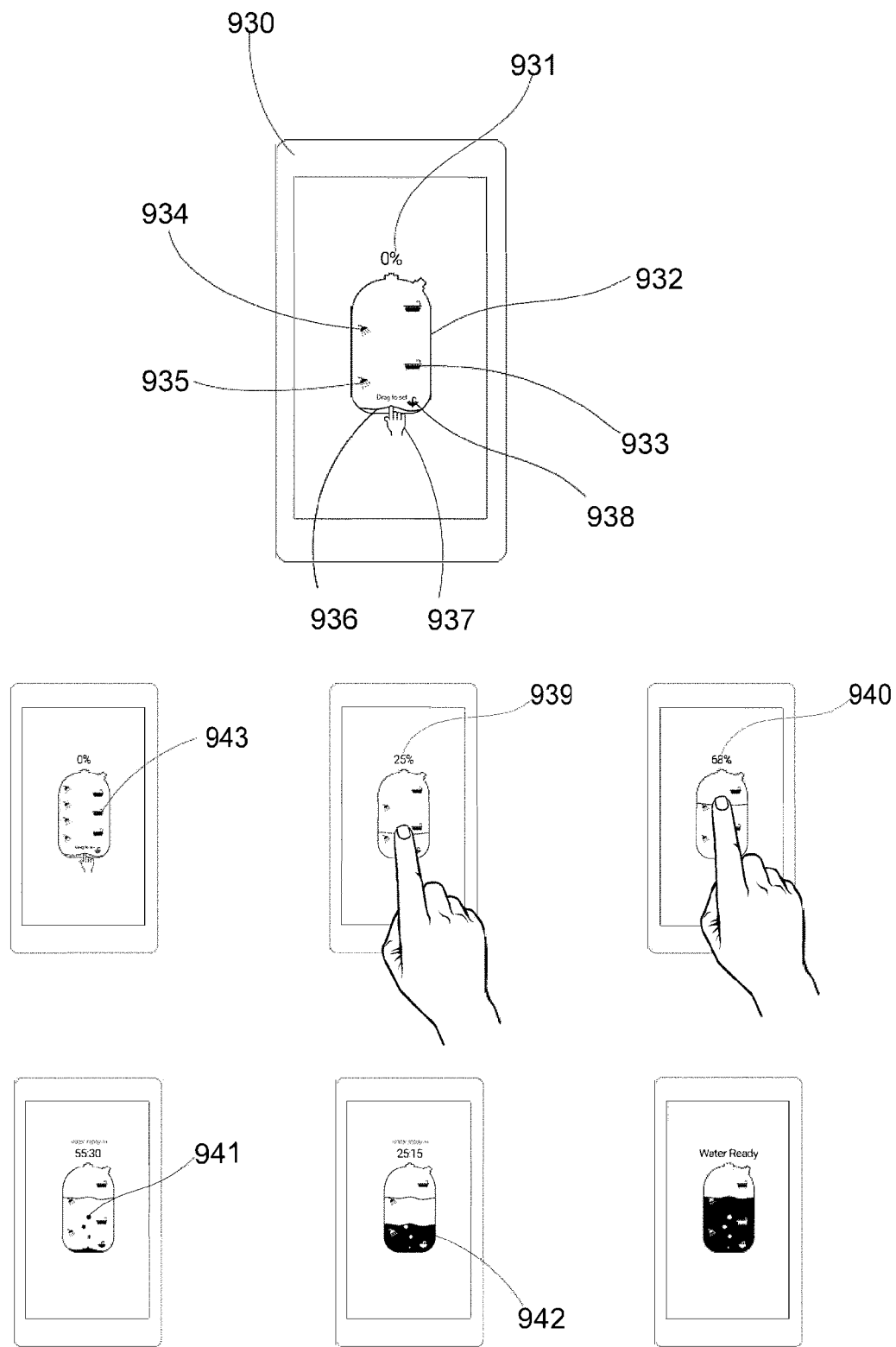
FIG. 16 shows one embodiment a mobile user interface.

FIG. 16 shows an input mechanism 930, such as a mobile device, including a visual representation of a hot water tank 932 with the quantity of hot water as a percentage of total tank capacity shown 931. Icons depicting bath 933, sink 938 and showers 934 and 935 are also included. A means to request hot water 936 and hints as to how to do so 937 are also included.

943 indicates the dynamic ability said icons to reflect various user profiles.

939 shows a user requesting a 25% full tank of hot water.

940 shows a user requesting a 68% full tank of hot water.

941 shows a countdown timer displaying time until hot water is ready.

942 shows target hot water level above actual hot water level mid way through a heating event.

Figure 17:
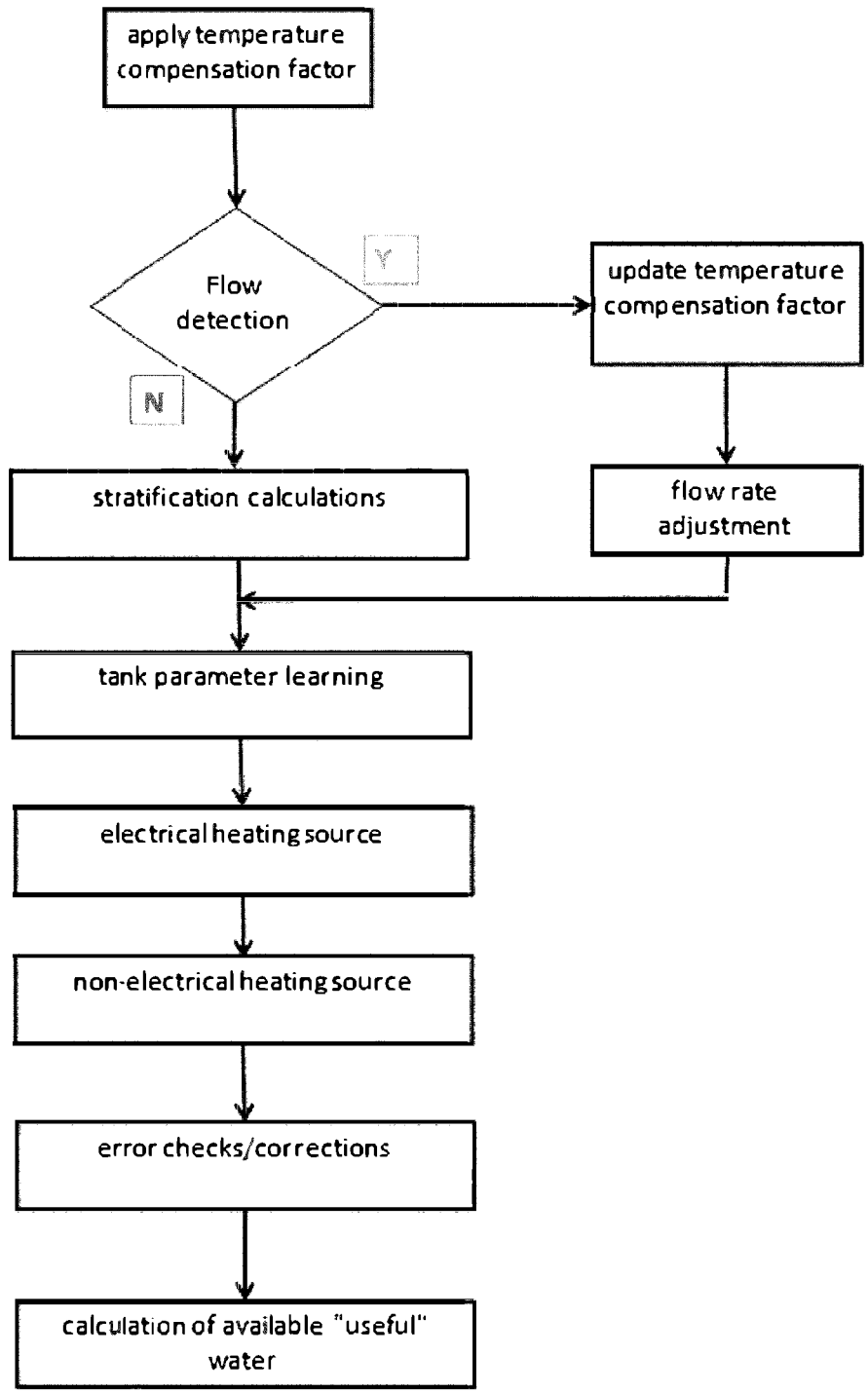
FIG. 17 is a flowchart illustrating the key steps in a first embodiment of program used to operate the system.

FIG. 17 shows the main flow charts.

Figure 18:
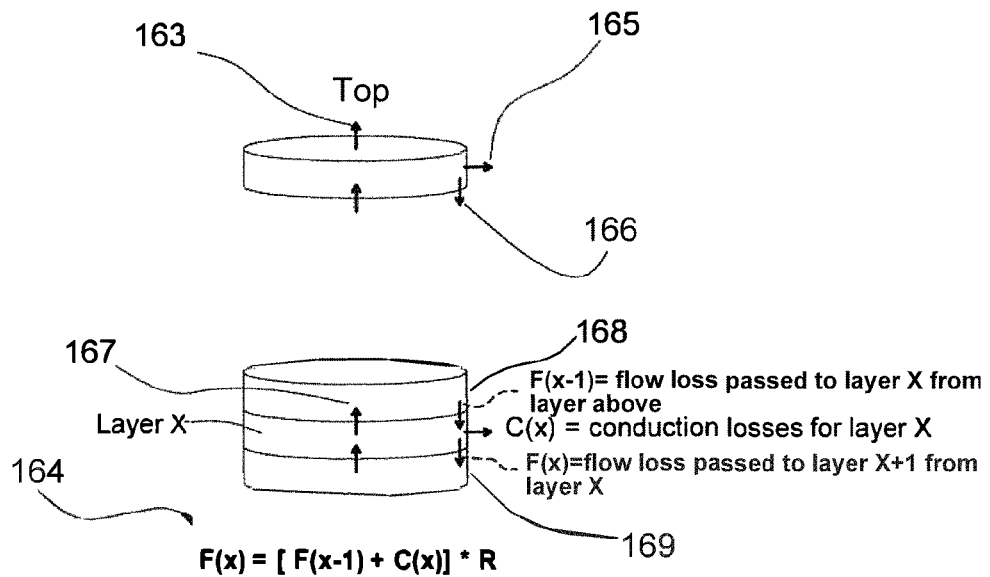
FIG. 18 shows a model of a tank with discrete slices along the length of the tank so that each section resembles a disc with a given volume of water.
Figure 18:
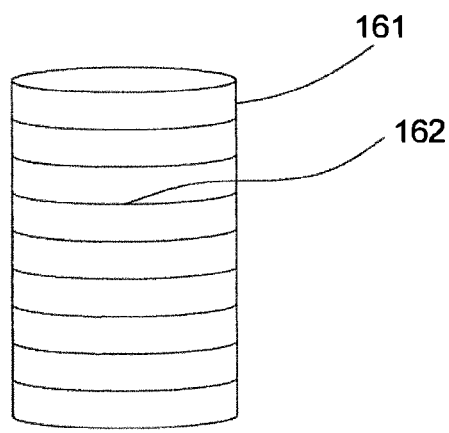

FIG. 18 shows a model of a tank 161 with discrete slices along the length of the tank 162 so that each section resembles a disc with a given volume of water The stratification ratio formula 164 is shown $$F(x)=[F(x-1)+C(x)]*R$$

Where $F(x-1)$—flow lass passed to layer X from layer above, $C(x)$=conduction losses for layer X, and $F(x)$=flow loss passed to layer X+1 from layer X.

where R=stratification ratio,

The stratification ratio is the proportion of the total losses for a layer that is passed to the layer below.

The ratio is linearly dependent on the temperature gradient that already exists between layer X and X+1, being unity when no gradient exists and reducing to zero when the gradient is (determined empirically)

The present invention provides one or more software modules which are operable to model the tank as discrete slices along the length of the tank so that each section resembles a disc with a given volume of water. It is assumed that all the water in each sub section has a uniform temperature. Data has been collected from different tank types in the field by monitoring temperatures along their length to get an understanding of how temperature distributes under different heating methods i.e. electrical heating elements versus solar or boiler.

Because it is not practical to directly measure the hottest part of the tank, the system depends on a temperature reading being taken along the outlet pipe, as near as possible to the top of the tank. A compensation method is employed to adjust this temperature reading to closer match the temperature at the top of the tank.

When the system is at rest, there will be a temperature delta between both temperature sensors on the outlet pipe, with the sensor furthest from the tank being cooler than the other. When flow occurs, water from the hottest part of the tank will pass by both sensors and both temperature readings will converge. This is one mechanism which is used to identify when flow occurs. Similarly when flow stops, the temperature readings will diverge, with the sensor furthest from the tank cooling quicker than the other, which provides a mechanism to detect when flow has ceased. In addition, when flow occurs, the temperature recorded by the sensors will be that of the water drawn from the top of the tank. This provides an opportunity to determine a compensation factor by tracking the temperature rise detected by the first sensor on the outlet pipe. This correction factor can then be employed to correct future values recorded by the sensor to more accurately represent the temperature at the top of the tank.

Finally, when flow is detected, the stratification model previously determined, is used to track flow through the tank and thereby determine the revised stratification in the tank as a result of the water draw event. Matching the temperature recorded on the outlet pipe with previously calculated stratification levels in the tank will allow the volume of the draw i.e. flow rate, to be determined.

When the tank is in a state of equilibrium i.e. no heating source and no flow, heat is lost from the system through conduction losses. These losses will occur through the top of the tank and sides of the tank. Water cooled at the side of the tank will flow down the outside of the tank, with hotter water from lower layers, moving up the centre of the tank, leading to stratification naturally occurring in the tank, with less efficient tanks giving a faster rate of stratification due to the increased losses. This results in each layer losing energy via conduction losses through the side of the tank as well as convection losses due to the currents generated in the tank. Some energy is also replaced due to eddy current from the layer underneath. The amount of energy loss passed to the layer beneath is proportional to the total loss for the layer and has an inverse linear relationship with the temperature gradient to the layer below i.e. the lower the temperature gradient, the greater the eddy current generated and therefore the greater energy loss passed to the layer beneath. The energy loss passed from layer to layer can be determined by monitoring the losses from the tank, and the stratification naturally occurring in the tank determined.

The rate of temperature drop at the top of the tank, allows a figure of merit for energy performance of the tank to be determined. This is determined by monitoring the tanks energy retention performance over an extended period. This performance factor can then be used when the tank is in a dynamic state e.g. heating source applied, to determine stratification levels that will be evolving during the dynamic state. This is necessary due to the fact that the energy losses from the system cannot be directly measured due to energy being added to the system at the same time. During such a condition, the property previously learned by the system, can be employed in order to maintain the stratification model for the system.

Once the stratification model has been applied, the energy from relevant heating sources can be applied to the system when applicable. For electrical sources, in one embodiment, the energy applied is measured by a separate sensor. The temperature rise at the top of the system is then used to determine how many layers are impacted such that the energy supplied by the source is fully distributed throughout the system.

The properties of the water in the aforementioned elements is presumed to be uniform across the element. Empirical stratification models have been developed for different tank geometries and energy sources. Energy input levels are directly measurable using a current measuring means, such as a current transformer, with the processing element configured to receive signals from the current measuring means, or alternatively power levels of each heating element are inputtable as fundamental properties of the system for incorporation into the method.

For non-electrical sources, the total energy added is not known. For such sources, the system can receive an input specifying the number of layers heated by such a source and the temperature rise detected at the top of the system used to determine energy distribution within the system. Another option is for the system to learn this property after a system discharge is implemented subsequent to a heating cycle in order to determine volume of water heated by the non-electrical source.

In the event of an additional temperature sensor fitted to the tank, an error correction method can be employed to cross reference the stratification model to the extra sensor to further improve accuracy.

The energy storage, above 0° C., of each sub layer is the primary variable used in the method. The specific heat capacity of the water, and volume of each layer, is then used to calculate the average temperature of each layer, and finally the total volume of useful water available to the end user.

The method is iterative in that it bases its calculation on temperature profile on the previous temperature profile i.e. historical information is required and then impact of energy in and energy out is calculated. The profile cannot be determined by simply taking a temperature measurement.

There are occasions in the normal heat and cooling operation cycle of a hot water storage device when the stratification model has to work with limited resolution from a lightly stratified tank. In one embodiment of the invention a dynamic bias method is run to improve this position by combining two or more methods of tracking the energy in the tank. Over time the processing means will establish an average energy reduction flow rate per second for each specific tank, this data when used in conjunction with the stratification models energy level data as a starting point can be formulated to give a second figure of the energy stored in the tank, this figure reduces as and when a draw is detected based on the energy reduction flow rate per second value. If this figure is combined with the figure from the stratification model with the biasing method that dynamically adjusts the bias based on the performance of the processing method in the sections of the operation cycle where empirical data, with or without statistical methods, such as regression analysis, are used to calibrate the biasing proportions of one process of measurement against the other, a more accurate result of the energy can be obtained than if only one method was used.

The method is also based on calculating energy storage in each sub section. Once the energy storage of each section is known, this can be converted to an average temperature for that section based on the previously defined volume of the sub section. Each sub section can deliver a greater volume of useful water than the volume of the actual sub section by heating the water in that section higher than the temperature chosen as the useful water threshold i.e. if useful water threshold is set to 40 degrees, then 10 litres of water at 60 degrees can deliver 20 litres of useful water by mixing the 60 degree water with 10 litres of 20 degree water (giving 20 litres at an average temperature of 40 degrees).

This principle is used to calculate the yield of useful water from each sub section thereby reporting total volume of useful water available from the system. The model in the method calculates the impact each energy source will have on the profile of the water in the tank.

The method described above involves distributing energy from different sources within the system. The same method can be used to hypothetically calculate the impact of different sources being applied to the system. Therefore if the user requests more water, the method can run a hypothetical scenario of each heating source on in turn to calculate the required energy input and the required time to deliver the required amount of water.

The system can therefore calculate the optimum way to deliver the required volume of water to the user—optimum may mean with the least amount of energy or the quickest time or the lowest cost (may not be the same). The system can also control the required heating element, for the required length of time, at the required rate, to deliver the required water and notify the user when ready.

Accordingly, the present invention provides an apparatus and methods for managing hot water in a hot water storage tank heating system.

The invention provides means for tracking the temperature profile of hot water in hot water tanks, to allow reporting to the user regarding how much hot water they have available to use.

The invention provides one or more software modules which are operable to calculate how the temperature profile varies as a tank is heated from different sources e.g. when the tank is heated with the sink immersion it will change the profile compared to when it is heated from the boiler.

The invention provides one or more software modules which are operable to convert the temperature profile into a "useful litres" amount or the user i.e. user will get a simple display informing them of the volume of hot water available to them.

The invention provides a control means for turning on and off the different sources for heating the tank. These controls will also have a remote access capability so that the energy sources can be turned on remotely.

One or more software modules are operable to determine how different heat sources impact on the tank so that the method can deliver functionality to the user, when they request a certain amount of water. The system can then calculate the optimum way to deliver that water and control the respective heating source to deliver that the required hot water.

The invention provides water tanks having remote control capability as well as being able to report on current energy storage in the tank. The tank can be used as part of a larger population for grid stabilisation purposes or demand side management (DSM) e.g. when excess wind is available, all tanks can be commanded to turn on in order to use the excess energy or when the grid is approaching its capacity limit, tanks can be turned off for periods to reduce load on the grid. The remote control capability also gives the transmission system operation (TSO) and the distribution system operation (DSO) the ability to adjusting the preset rules on how to react when a voltage or frequencies, disturbance event occurs on the energy grid, typically by adjusting its load on the system As well as one or more software modules which are operable to track heat sources into the tank, it is critical to track water flow from the tank in order to update the temperature profile in the tank when water is drawn off.

The present invention provides a unique way of doing this through monitoring how the temperature of the outlet pipe varies. This gives a simple non-intrusive way of determining a parameter for one or more software modules to operate.

Aspects of the present invention have been described by way of example only and it should be appreciated that alterations and/or modifications may be made thereto without departing from the scope thereof as defined in the appended claims.

The invention claimed is:

1. Apparatus for managing hot water in a hot water storage tank heating system having a hot water tank with an inlet pipe and an outlet pipe, the apparatus comprising:
   a mounting bracket for attaching to the outlet pipe of the hot water tank, the mounting bracket being arranged to hold one or more temperature sensors, the one or more temperature sensors being arranged to provide temperature sensor signals from the outlet pipe,
   a computer implemented processor configured to receive the temperature sensor signals, wherein the processor is arranged to run one or more processors to establish the temperature distribution within the hot water tank and an interface to communicate with a user or additional processors either locally or remotely,
   wherein the one or more temperature sensors include a first temperature sensor and a second temperature sensor, each of the first temperature sensor and the second temperature sensor positioned on the outlet pipe and positioned within the mounting bracket such that the area between the first temperature sensor and the second temperature sensor is unoccupied, the first temperature sensor being insulated, and cooling features provided around the second sensor thereby promoting a larger temperature delta across the mounting bracket, and the processor is configured to use the larger temperature delta to identify when water is being drawn from the hot water storage tank heating system, with increased accuracy.

2. Apparatus for managing hot water in a hot water storage tank heating system as claimed in claim 1, in which a program incorporated in the processor models the hot water tank as discrete uniform elements along the vertical axis of the hot water tank, the properties of the water in the discrete uniform elements being assumed to be uniform across each element, with empirical stratification models being developed for different tank geometries and energy sources, and in which energy input levels are directly measurable using a current transformer with the processing element configured to receive signals from the current transformer, or alternatively power levels of each heating element are inputtable as fundamental properties of the hot water storage tank heating system for incorporation into the program.

3. Apparatus for managing hot water in a hot water storage tank heating system as claimed claim 1, in which the dynamic characteristics of a temperature recorded by the one or more temperature sensors closest to the top of a tank sensor together with information on energy source (either sensed or input as a characteristic), is usable to determine energy stratification from the energy source to discrete elements within the hot water tank allowing a profile model within the hot water tank to be recursively developed over time.

4. Apparatus for managing hot water in a hot water storage tank heating system as claimed in claim 1, in which after an indirect energy source has been used, a full or partial discharge cycle of the hot water storage tank heating system will allow energy input from the indirect energy source to be determined for future use in a stratification model, energy losses from the hot water tank being dependent on various characteristics of the hot water storage tank heating system and environment including temperature delta between ambient temperature and discrete slice elements, thickness and properties of insulation, the processing arrangement using a lower bandwidth dynamic property of a temperature at a fixed location to establish energy storage properties of the hot water tank.

5. Apparatus for managing hot water in a hot water storage tank heating system as claimed in claim 1, in which a loss rate from the hot water tank is dependent on an energy storage density in the hot water tank, wherein a smaller volume of water will cool faster than a larger volume of water stored at the same temperature as a result of the increased surface areas and wherein such characteristic is usable by the processor to determine a volume of water heated by different sources.

6. Apparatus for managing hot water in a hot water storage tank heating system as claimed in claim 1, in which the largest source of energy loss from the hot water storage tank heating system occurs when the hot water is drawn from the hot water storage tank heating system, the outlet pipe having a slight temperature difference with the top temperature of the tank, due to the cooling effect of ambient air on the outlet pipe, such that when the hot water is drawn from the hot water storage tank heating system, the outlet pipe momentarily experiences a temperature rise which the processor is operable to detect when water is being drawn from the hot water storage tank heating system.

7. Apparatus for managing hot water in a hot water storage tank heating system as claimed in claim 1, in which the accuracy is improved by insulating the first sensor and the outlet pipe and fittings between the first sensor and the tank thereby promoting the larger temperature delta between the first and second sensor thereby increasing accuracy.

8. Apparatus for managing hot water in a hot water storage tank heating system as claimed in claim 1, in which the accuracy of the hot water storage tank heating system is improved by incorporating an ambient temperature sensor arranged to provide the processing arrangement with data on the ambient temperature that is acting on the tank and on the inlet pipe, allowing the hot water storage tank heating system to dynamically compensate for the effect of incorporating the ambient temperature sensor on the outlet sensors rate of change and the offsets required in normal operation.

9. Apparatus for managing hot water in a hot water storage tank heating system as claimed in claim 1, in which the processor uses the temperature delta to identify when the hot water is being drawn from the system, wherein when the hot water stops flowing the outlet pipe will again cool allowing the processor to detect when the hot water flow has ceased, wherein the accuracy is improved by incorporating the second temperature sensor so that temperature deltas are increased and a rate at which temperatures converge is also used to determine the flow rate through the outlet pipe.

10. Apparatus for managing hot water in a hot water storage tank heating system as claimed in claim 1, in which as hot water is drawn from the highest sub element of the system, cold water is drawn into the system, at the lowest sub element, internal energy transfer within the system being in a vertical direction from sub element to sub element which the processor incorporates into a stratification model such that the resultant model will have incorporated the energy drawn from the system and the impact that it has on the energy stratification within the system.

11. Apparatus for managing hot water in a hot water storage tank heating system as claimed in claim 1, in which a stratification model is in accordance with the following:

$$\text{Element}(x)\_t(0) = \text{element}(x)\_t(-1) * \text{Loss\_rate} + [\text{element}(x+1)\_t(-1) - \text{element}(x)\_t(-1)] * \text{flow}$$

where

Element(x)_t(0) is a current energy storage above 0° C. for any sub element of the tank Element(x)_t(−1) is an energy storage above ambient for the current sub element calculated in the previous predefined period Element(x+1)_t(−1) is the energy storage in the sub element below element x in the previous predefined period flow=flow rate from the hot water storage tank heating system Loss_rate=inefficiency rating of hot water tank.

12. Apparatus for managing hot water in a hot water storage tank heating system as claimed in claim 1, in which an iterative method incorporated in the processor maintains a real time representation of energy storage of each sub element of the hot water storage tank heating system, wherein by applying the specific heat capacity property of water to the iterative method allows a profile to be converted to temperature of each sub section, wherein a desired water temperature is known, an available hot water can be determined by calculating volume of ambient water to be added to each sub element in order to deliver the available hot water at a required temperature, thereby calculating a total potential capacity of useful hot water using a formula:

$$L = \sum_{sec=1}^{n} \text{if } (T(sec) > Tu, Ls * (T(sec) - Tu)/(Tu - Ta))$$

where

L=total useful liters available

Sec=section number

T(sec)=temperature of sub section

Tu=predefined temperature of required water

Ls=capacity of each sub section

Ta=temperature of cold water feed thereby allowing the system to report to the user or any relevant third party in real time the total potential capacity of the useful hot water.

13. Apparatus for managing hot water in a hot water storage tank heating system as claimed in claim 1, in which empirical stratification models are used to recursively predict future stratification profiles within the hot water tank when different energy sources are enabled, the processor incorporating an input mechanism from the user to request a fixed amount of the hot water, the processor recursively predicting the stratification in the hot water tank based on each heating source to deliver a volume of hot water and making a decision on which heating source to engage and what rate to deliver said volume of hot water based on either minimizing energy usage, speed of delivery or cost of delivery, depending on which is considered a higher priority or not appropriate.

14. Apparatus for managing hot water in a hot water storage tank heating system as claimed in claim 1, in which the processor controls energy source as required, and monitors system performance to provide closed feedback control and notify the user when a required volume of the hot water is available, thereby providing considerable advantages to the end user as the user can interact with the system by requesting volumes of the hot water and the system intelligently manages the system to deliver the required volume of the hot water as quickly as possible or with minimum amount of waste.

15. Apparatus for managing hot water in a hot water storage tank heating system as claimed in claim 1, in which energy data is calculated as actual useful liters of the hot water and displayed to the user through a user interface which shows the actual useful liters as a percentage of the total tank capacity, the percentage being displayed to the user in the form of varying levels of the hot water representing the actual useful liters of the hot water on a display or inside a visual representation of the typical hot water tank, optionally the percentage being displayed as horizontal bar graphs representing discrete slices directly correlating to temperature inside a visual representation of a typical hot water tank with a temperature scale, or optionally, the percentage being displayed using bar graphs with varying temperatures represented by differently colored bars; wherein such presentations are simplified and improved methods of presenting the percentage to the user when compared to a basic hot water temperature reading.

16. Apparatus for managing hot water in a hot water storage tank heating system as claimed in claim 1, in which the processor incorporates a remote communications element which includes but is not limited to power line communications allowing the system to receive requests/commands locally or remotely with regard to excess or too little power or other reasons relating to energy price signal, DSM signal, and adjusting preset rules on how to reacting to voltage or frequencies, disturbances or events thereby allowing the system to act as an element in a macro system where multiple systems are controlled together or in groups for grid management purposes, including an event of excess renewable energy being available, multiple systems are commanded to use the excess energy and stabilize the grid.

17. Apparatus for managing hot water in a hot water storage tank heating system as claimed in claim 1, in which the processor collects data on the heat loss properties of the tank, the data being used to give the hot water tank and hot water storage tank heating system an energy efficiency rating and identify which systems are under performing and suitable for upgrade to more modern, energy efficient alternatives.

18. Apparatus for managing hot water in a hot water storage tank heating system as claimed in claim 17, in which the processor collects the data on hot water storage tank heating systems that underperform, display unusual operations or indicate fault detection and presents the data locally and remotely.

19. Apparatus for managing hot water in a hot water storage tank heating system as claimed in claim 1, in which the processor identifies hot water draw from the hot water storage tank heating system and incorporates a learning element to predict repeated cycles of usage, wherein the hot water storage tank heating system can then proactively manage the system with regard to the cost of the energy required and the time of use to deliver the repeated cycles of usage.

20. Apparatus for managing hot water in a hot water storage tank heating system as claimed in claim 1, in which the processor is arranged to monitor main power voltage and the hot water in a hot water storage tank heating system frequency and act accordingly to follow predetermined rules following a disturbance to either voltage or frequency or both, by adjusting a load on the system.

21. Apparatus for managing hot water in a hot water storage tank heating system as claimed in claim 1, in which the hot water in the hot water storage tank heating system collects data on hot water usage which are collated for social studies on the hot water usage, energy usage, behaviors and lifestyle.

22. Apparatus for managing hot water in a hot water storage tank heating system as claimed in claim 1, the mounting bracket further including a lower mounting section and an upper mounting section, the lower mounting section including a first temperature sensor insulation lower portion and a second temperature sensor ventilation area, the upper mounting section including a first temperature sensor insulation upper portion and a temperature sensor mounting platform.

23. Apparatus for managing hot water in a hot water storage tank heating system having a hot water tank with an inlet pipe and an outlet pipe, the apparatus comprising:
a mounting bracket, for attaching to the outlet pipe of the hot water tank, the mounting bracket being arranged to hold one or more temperature sensors, the one or more temperature sensors being arranged to provide temperature sensor signals from the outlet pipe;
a computer implemented processor configured to receive the temperature sensor signals and an interface to communicate with a user or additional processors either locally or remotely; and
wherein a stratification model is in accordance with the following:

$$\text{Element}(x)\_t(0) = \text{element}(x)\_t(-1) * \text{Loss\_rate} + [\text{element}(x+1)\_t(-1) - \text{element}(x)\_t(-1)] * \text{flow}$$

wherein
Element(x)_t(0) is the current energy storage above 0° C. for any sub element of the tank
Element(x)_t(−1) is the energy storage above ambient for the current sub element calculated in the previous predefined period
Element(x+1)_t(−1) is the energy storage in the sub element below element x in the previous predefined period
flow=flow rate from system
Loss_rate=inefficiency rating of tank.

24. Apparatus for managing hot water in a hot water storage tank heating system comprising one or more temperature sensors, a mounting bracket, a computer implemented processor configured to receive the temperature sensor signals and an interface to communicate with a user or additional processors either locally or remotely; and
wherein, an iterative method incorporated in the maintains a real time representation of energy storage of each sub element of the hot water storage tank heating system, wherein by applying the specific heat capacity property of water to the iterative method allows a profile to be converted to temperature of each sub section, wherein a desired water temperature is known, an available hot water can be determined by calculating volume of ambient water to be added to each sub element in order to deliver the available hot water at a required temperature, thereby calculating a total potential capacity of useful hot water using a formula:

$$L = \sum_{sec=1}^{n} \text{if } (T(sec) > Tu, Ls * (T(sec) - Tu)/(Tu - Ta))$$

where
L=total useful liters available
Sec=section number
T(sec)=temperature of sub section
Tu=predefined temperature of required water
Ls=capacity of each sub section
Ta=temperature of cold water feed
thereby allowing the system to report to the user or any relevant third party in real time the total potential capacity of the useful hot water.

* * * * *